April 28, 1970 P. MECKLENBURG 3,509,365

ANTICOINCIDENCE CIRCUIT

Filed Dec. 19, 1966

| INPUT SIGNALS | | | | NODE POTENTIALS | | | | TRIGGER SIGNAL COUPLED TO LEAD | TRANSISTOR TURNED OFF | OUTPUT SIGNAL |
|---|---|---|---|---|---|---|---|---|---|---|
| I | $\overline{I}$ | J | $\overline{J}$ | 35 | 36 | 37 | 38 | | | OUT |
| 0 | 1 | 0 | 1 | 0 | 1/2 | 1 | 1/2 | 31 | 22 | 0 |
| 0 | 1 | 1 | 0 | 1/2 | 0 | 1/2 | 1 | 32 | 23 | 1 |
| 1 | 0 | 0 | 1 | 1/2 | 1 | 1/2 | 0 | 32 | 23 | 1 |
| 1 | 0 | 1 | 0 | 1 | 1/2 | 0 | 1/2 | 31 | 22 | 0 |

INVENTOR
P. MECKLENBURG
BY
Charles Scott Phelan
ATTORNEY

United States Patent Office 3,509,365
Patented Apr. 28, 1970

3,509,365

ANTICOINCIDENCE CIRCUIT

Paul Mecklenburg, Fort Lee, N.J., assignor to Bell Telephone Laboratories, Incorporated, Murray Hill, N.J., a corporation of New York Filed Dec. 19, 1966, Ser. No. 602,948
Int. Cl. H03k *19/32*
U.S. Cl. 307—216 7 Claims

ABSTRACT OF THE DISCLOSURE

A logic circuit is developed from a combination of a flip-flop and two steering circuits arranged for applying double-rail input variables to control the flip-flop state on an EXCLUSIVE OR basis.

BACKGROUND OF THE INVENTION

The invention is an anticoincidence circuit that is more particularly described as a combination of passive circuit elements for producing an EXCLUSIVE OR function of two separate input variables.

In prior are electronic feedback shift registers, in which the output state of some stage is looped back to the input of one or more stages, EXCLUSIVE OR gates are interposed between the stages of a tandem array of toggle flip-flop stages. The EXCLUSIVE OR gates and the toggle flip-flop stages are separate logic circuits that are interconnected in accordance with standard logic patterns. Inputs to an EXCLUSIVE OR gate interposed between a previous stage and a subsequent stage in the tandem array of stages are connected respectively to the output of the previous stage and to the output of the stage having its output state looped back. The output of the EXCLUSIVE OR gate is connected to the input of the subsequent stage.

The toggle flip-flop circuit is a bistable circuit that is constrained to assume one or the other of two stable states in response to corresponding states of double-rail control signals at the time of a predetermined transition of a clock drive signal.

In the prior art, transistor-resistor logic (TRL) circuits have often been used as the EXCLUSIVE OR gates. Each transistor-resistor logic (TRL) circuit is arranged as a NOR logic gate, and three TRL NOR gates are required in an EXCLUSIVE OR gate. Each TRL NOR gate includes a plurality of inputs through separate resistors to a base electrode of a transistor and an output from a collector electrode of the transistor. The EXCLUSIVE OR gates therefore are a large cost factor relative to the cost of each toggle flip-flop.

SUMMARY OF THE INVENTION

An object of the invention is to improve EXCLUSIVE OR circuits.

Another object is to improve dynamic EXCLUSIVE OR circuits.

A further object is to reduce the number of active components used in an EXCLUSIVE OR circuit.

Another object is to develop a circuit unit that produces an EXCLUSIVE OR function of two variables more economically than previously possible witih general purpose transistor-resistor logic.

These and other objects of the invention are realized in a combination of a plurality of steering circuits and a plurality of voltage dividers, which combination produces an EXCLUSIVE OR function of two separate input variables. The two input variables together with their complements are applied to the voltage dividers for conditioning the steering circuits to constrain a flip-flop to assume one of two possible stable states. When a timing signal is applied to the steering circuits, they produce a trigger signal which constrains the flip-flop to assume a state that agrees with the EXCLUSIVE OR function of the two input variables.

A feature of the invention is the coupling of a plurality of voltage dividers to a plurality of steering circuits to condition the steering circuits to produce signals corresponding with an EXCLUSIVE OR function of two input variables applied to the voltage dividers.

Another feature is the coupling of the steering circuits to a bistable circuit that is constrained by the signals from the steering circuits to assume one of two stable states in correspondence with the EXCLUSIVE OR function.

BRIEF DESCRIPTION OF THE DRAWING

A better understanding of the invention may be derived from the detailed description following if that description is considered with respect to the attached drawing in which.

DETAILED DESCRIPTION

Figures 1, 2:
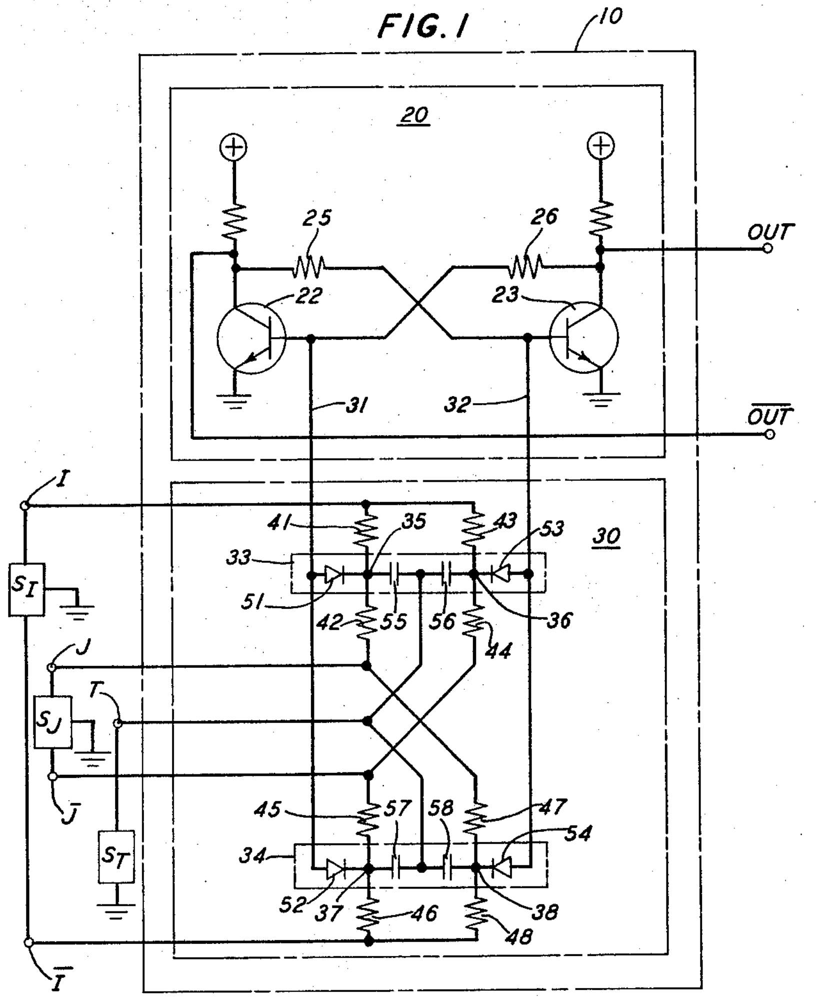
FIG. 1 is a schematic drawing of a toggle flip-flop arranged to produce and store an EXCLUSIVE OR function.
FIG. 2 is a truth table for the toggle flip-flop of FIG. 1.

Referring now to FIG. 1, there is shown a toggle flip-flop circuit 10 that produces on an output terminal OUT an EXCLUSIVE OR function of two independent input variables applied respectively to input terminals I and J. The EXCLUSIVE OR function of the variables applied to the terminals I and J is stored in a bistable circuit 20 in response to a timing drive signal applied to a timing lead T. The bistable circuit 20 is a circuit that assumes one or the other of two states in response to binary input signals and provides an indication of its state at an output such as output terminals OUT and $\overline{\text{OUT}}$. After a timing signal is applied to the lead T and the bistable circuit 20 has settled into a new conduction state, the output signal produced from the principal output terminal OUT corresponds with the EXCLUSIVE OR function of the principal variables applied to the input terminals I and J.

The bistable circuit 20 is a conventional bistable circuit that is often used for one stage of a tandem sequence of states storing bits of a data sequence in a feedback shift register.

As shown illustratively in FIG. 1, the circuit 20 includes two cross-coupled NPN transistors 22 and 23 that are arranged to conduct in saturation alternatively. Both of the transistors 22 and 23 are connected in grounded-emiter configurations. A collector electrode of the transistor 22 is coupled by way of a resistor 25 to a base electrode of the transistor 23, and a collector electrode of the transistor 23 is coupled by way of a resistor 26 to a base electrode of the transistor 22. The output terminal OUT for the principal output function is connected to the collector electrode of the transistor 23, and the output terminal $\overline{\text{OUT}}$ for a complement of the principal output function is connected to the collector electrode of the transistor 22.

The bistable circuit 20 is constrained to assume one or the other of two stable states of conduction in response to signals applied to the base electrodes of the transistors 22 and 23. A negative potential signal applied to either base electrode in the absence of a negative signal to the other base electrode cuts off the transistors to which the negative potential is applied, no matter what state of conduction previously existed. For instance, assume that the transistor 23 is conducting when its base electrode has a negative potential applied to it. Thereby the base-emitter junction of the transistor 23 is reverse-biased; and the transistor 23 is cut off.

The potential on the collectors electrode of the transistor 23 therefore rises to a positive potential that is coupled to the output terminal OUT and by way of the resistor 26 to the base electrode of the transistor 22. The base-emitter junction of the transistor 22 is thereby forward-biased, and the transistor 22 conducts in saturation. Ground potential is coupled through the transistor 22 to its collector electrode and to the output terminal $\overline{OUT}$.

Now assume that the transistor 23 is cut off when its base electrode has a negative potential applied to it. The transistor 23 remains cut off so that a positive potential is coupled to the terminal OUT and ground potential is coupled to the terminal $\overline{OUT}$.

Therefore, by applying a negative potential to the base electrode of the transistor 23, a high potential level is produced at the output terminal OUT; and a low potential level is produced at the outer terminal $\overline{OUT}$. Conversely, a negative potential applied to the base electrode of the transistor 22 produces a high potential level at the output terminal $\overline{OUT}$ and a low potential level at the output terminal OUT, no matter what previous state of conduction existed.

An input circuit 30 is arranged to apply negative potential trigger signals alternatively over leads 31 and 32 to the base electrodes of the transistors 22 and 23 in response to double-railed input variables produced by signal sources $S_I$ and $S_J$ and applied to input terminals I, $\bar{I}$ and J, $\bar{J}$. The negative potential trigger signals are produced when the timing signals are applied to lead T. The input circuit 30 includes two steering circuits 33 and 34 that are conditioned to respond in accordance with combinations of input signals because of a plurality of cross-coupled voltage dividers which couple the input signals from the input terminals to the steering circuits for conditioning the input circuit 30. The input signals applied to the input terminals I, $\bar{I}$ and J, $\bar{J}$ fix the potentials at nodes 35, 36, 37 and 38 of the steering circuits 33 and 34 prior to the application of the timing lead over the lead T.

Two voltage dividers couple the input terminals I, J, and $\bar{J}$ to the first steering circuit 33 for conditioning the first steering circuit 33 in accordance with signals applied to those input terminals. A first voltage divider comprising resistors 41 and 42 couples the terminal I to the terminal J and has between the resistors 41 and 42 an intermediate terminal which is connected to the node 35. A second voltage divider comprising the resistors 43 and 44 couples the terminal I to the terminal $\bar{J}$ and has between the resistors 43 and 44 an intermediate terminal which is connected to the node 36. Signals applied to the input terminals I and J establish potential level conditions on the node 35, and signals applied to the input terminals I and $\bar{J}$ establish potential level conditions on the node 36.

Two additional voltage dividers couple the input terminals J, $\bar{J}$, and $\bar{I}$ to the second steering circuit 34 for conditioning the second steering circuit 34 in accordance with signals applied to the latter three input terminals. A third voltage divider comprising the resistors 45 and 46 couples the terminal $\bar{J}$ to the terminal $\bar{I}$ and has between the resistors 45 and 46 an intermediate terminal which is connected to the node 37. A fourth voltage divider comprising resistors 47 and 48 couples the terminal J to the terminal $\bar{I}$ and has between the resistors 47 and 48 an intermediate terminal which is connected to the node 38. signals applied to the input terminals $\bar{J}$ and $\bar{I}$ establish potential level conditions on the node 37, and signals applied to the input terminals J and $\bar{I}$ establish potential level conditions on the node 38.

In the previously mentioned voltage dividers, the resistors 41–48 all have essentially equal resistance so that the potential level condition established on each of the nodes 35–38 is midway betwen the potentials on the two input terminals coupled together by the relevant voltage divider.

In the first and second steering circuits 33 and 34, diodes, or other unilateral conduction devices, are used to couple negative potential trigger signals to the base electrodes of the transistors 22 and 23. Diodes 51 and 52 respectively couple the nodes 35 and 37 to the lead 31 so that negative potential trigger signals can be applied to the base electrode of the transistor 22 while a low level condition occurs on either the node 35 or the node 37. Diodes 53 and 54 respectively couple the nodes 36 and 38 to the lead 32 so that negative potential trigger signals can be applied to the base electrode of the transistor 23 while a low level condition occurs on either the node 36 or the node 38.

In the first and second steering circuits 33 and 34, the timing lead T is capacitively coupled to each of the nodes 35, 36, 37, and 38. In the first steering circuit 33, a capacitor 55 couples the lead T to the node 35, and a capacitor 56 couples the lead T to the node 36. In the second steering circuit 34, a capacitor 57 couples the lead T to the node 37, and a capacitor 58 couples the lead T to the terminal 38.

Since complementary input variables are applied to the input terminals I and $\bar{I}$ and to the input terminals J and $\bar{J}$, there are only four possible combinations of the input variables. Assuming the input variables are normalized signals so that a high level input signal can be considered to have a potential of "1" and a low level input signal can be considered to have a potential of "0," the permutations of the input variables together with states of the circuit 10 are readily arranged into a truth table as shown in FIG. 2.

In FIG. 2 each combination of the input variables is listed in a separate row of the truth table under the heading "INPUT SIGNALS." The potential of each node is shown under the heading "NODE POTENTIALS" in the same row with the input signal combination which is applicable. Because the resistors of each voltage divider in the input circuit 30 have equal resistance value, the potential at each node is halfway between the levels applied to the input terminals which are coupled together by the respective voltage dividers. As a result the potential on some nodes is shown to equal one-half the normalized full high level because a "1" level and a "0" level are applied to opposite ends of the relevant voltage divider.

In FIG. 1, a negative potential trigger signal is applied to the base of only one of the transistors 22 and 23 when the signal on the timing lead T makes a negative-going transition. A source of timing signals $S_T$ holds the timing lead T at a positive potential level at all times except when the input signals are to be used for constraining the bistable circuit 20 to assume one of its stable states. When the input circuit 30 is to produce a negative potential trigger signal on either of the leads 31 or 32, the potential on the timing lead T makes a negative-going transition of sufficient amplitude to couple a negative potential trigger signal only to the lead 31 or the lead 32 but not to both. The negative-going transition of the potential on the lead T is sufficient to produce a negative potential at the node having a "0" level at the time, but is insufficient to produce a negative potential on any node having either one-half of the high input signal voltage or the full high input signal voltage. The diode connected to the node having the "0" level is thereby biased to conduct and apply the negative potential as a trigger signal to the base electrode of the associated transistor. The diodes connected to the other three nodes remain back-biased and cut off.

In FIG. 2 the column headed "TRIGGER SIGNAL COUPLED TO LEAD" indicates whether a negative signal is coupled to the lead 31 or to the lead 32 for constraining the bistable circuit 20 to assume one or the other of the two states of conduction. The column headed "TRANSISTOR TURNED OFF" indicates which transistor is turned off for each combination of input signals in response to a drive signal transition on the timing lead T. The column headed "OUTPUT SIGNAL" indicates the normalized potential level of output signal on the terminal OUT as a result of the input signals of the respective combinations.

Advantageously, the "0" levels that occur on the nodes 35 and 37, grouped by means of the diodes 51 and 52 to the lead 31 and the "0" levels that occur on the nodes 36 and 38, grouped by means of the diodes 53 and 54 to the lead 32, result in trigger signals that constrain the bistable circuit 20 to assume a state of conduction corresponding with the EXCLUSIVE OR function of the inputs I and J.

The circuit 20 produces a low level on the terminal OUT when the inputs to the terminals I and J are alike. The node 35 has a "0" level when the input signals applied to the input terminals I and J are both low, and the node 37 has a "0" level when the input signals applied to the input terminals I and J are both high. By applying the negative-going transition over the lead T when a "0" level occurs on either of the nodes 35 or 37, a negative potential trigger signal is coupled by way of the associated diode 51 or 52 and the lead 31 to the base electrode of the transistor 22. No matter what previous state of conduction existed in the transistors 22 and 23, the negative potential trigger signal applied to the base electrode of the transistor 22 will drive that transistor to cut off and will turn on the transistor 23. Thus the output from the terminal OUT will be low when the inputs to the terminals I and J are alike.

Conversely, the circuit 20 produces a high level on the terminal OUT when the inputs to the terminals I and J are complementary. The node 38 has a "0" level when the input signal on terminal I is high while the input signal on terminal J is low, and the node 36 has a "0" level when the input signal applied to the input terminal J is high while the input signal applied to the input terminal I is low. By applying the negative-going transition over the lead T when a "0" level occurs on either of the nodes 36 and 38, a negative potential trigger signal is coupled by way of the associated diode 53 or 54 to the base electrode of the transistor 23 to drive that transistor to cut off and turn on the transistor 22. No matter what previous state of conduction existed in the transistors 22 and 23, the negative potential trigger signal applied to the base electrode of the transistor 23 will drive that transistor to cut off and will turn on the transistor 22. Thus the output from the terminal OUT will be high when the inputs to the terminals I and J are complementary.

The drive pulse applied over the lead T therefore will drive the transistors 22 and 23 of the bistable circuit 20 to conduct in accordance with the EXCLUSIVE OR function of the principal input variables applied to the input terminals I and J. Output signals produced at the principal output terminal OUT agree with the EXCLUSIVE OR function of the principal input variables applied to the input terminals I and J.

When the toggle flip-flop circuit 10 is used in a feedback shift register, the input and output terminals of the circuit 10 are connected in accordance with the conventional logic design of such a shift register. The circuit 10 is interposed as a stage between a previous stage and a subsequent stage in a tandem sequence of stages. The input terminals I and $\overline{I}$ are connected to output terminals of the previous stage and the output terminals OUT and $\overline{OUT}$ are connected to input terminals of the subsequent stage. The input terminals J and $\overline{J}$ are connected to output terminals of whatever stage produces signals that are to be fed back to the stage represented by the toggle flip-flop circuit 10. The timing lead T is connected to the clock drive of the shift register so that each cycle of the clock signal will cause the toggle flip-flop circuit 10 to produce and store the EXCLUSIVE OR function of the principal variables applied to the input terminals I and J.

The above-detailed description is illustrative of one embodiment of the invention and it is to be understood that other embodiments thereof will be obvious to those skilled in the art. These additional embodiments are considered to be within the scope of the invention.

What is claimed is:

1. A combination of plural steering circuits each having first and second nodes wherein the improvement comprises first unilateral conducting means included within the steering circuits and coupling the first nodes of the steering circuits together, second unilateral conducting means included within the steering circuits and coupling the second nodes of the steering circuits together, plural voltage dividers, each having a pair of end terminals for receiving level potential input signals and an intermediate terminal having a potential level midway between the potential levels of signals applied to the end terminals thereof, means directly connecting each intermediate terminal to a separate one of said nodes, and timing means directly connecting a first one of the steering circuits to a second one of the steering circuits.

2. A circuit in accordance with claim 1 further comprising a bistable circuit having first and second input terminals, the first unilateral conducting means coupling each of the first nodes of the steering circuits to the first input terminal, and the second unilateral conducting means coupling each of the second nodes of the steering circuits to the second input terminal.

3. A circuit in accordance with claim 1 further comprising a first signaling source producing complementary signals from first and second outputs, a second signal source producing complementary signals from first and second outputs, and the plural voltage dividers comprising a first voltage divider having an intermediate terminal connected to the first node of a first steering circuit and coupling the first output of the first signal source to the first output of the second signal source, a second voltage divider having an intermediate terminal connected to the first node of a second steering circuit and coupling the second output of the first signal source to the second output of the second signal source, a third voltage divider having an intermediate terminal connected to the second node of the first steering circuit and coupling the first output of the first signal source to the second output of the second signal source, and a fourth voltage divider having an intermediate terminal connected to the second node of the second steering circuit and coupling the first output of the second signal source to the second output of the first signal source.

4. A circuit in accordance with claim 3 further comprising a bistable circuit having first and second input terminals, the first unilateral conducting means coupling the first nodes of the first and second steering circuits to the first input terminal, and the second unilateral conducting means coupling the second nodes of the first and second steering circuits to the second input terminal.

5. A circuit in accordance with claim 4 in which the bistable circuit is a flip-flop circuit, the first, second, third, and fourth voltage dividers comprise two resistors having essentially equal resistance, and each steering circuit further comprises a timing lead and means capacitively coupling the timing lead to the first and second nodes.

6. A circuit in accordance with claim 5 in which the bistable circuit comprises first and second transistors, each arranged in grounded-emitter configurations and cross-coupled to conduct alternatively.

7. A combination in accordance with claim 1 in which the plural voltage dividers include a first voltage divider including only resistors having an intermediate terminal connected to a first node of the first steering circuit, a second voltage divider including only resistors having an intermediate terminal connected to a first node of the second steering circuit, a third voltage divider including only resistors having an intermediate terminal connected to a second node of the first steering circuit, a fourth voltage divider including only resistors having an intermediate terminal connected to a second node of the second steering circuit, and means directly connect the first, third, second, and fourth voltage dividers in series in a closed loop.

References Cited

UNITED STATES PATENTS

| | | | |
|---|---|---|---|
| 3,278,758 | 10/1966 | Vroman | 307—216 X |
| 3,348,069 | 10/1967 | Petschauer | 307—221 |

DONALD D. FORRER, Primary Examiner

U.S. Cl. X.R.

307—247